(12) United States Patent
Faynberg et al.

(10) Patent No.: US 11,095,616 B2
(45) Date of Patent: *Aug. 17, 2021

(54) VIRTUALIZED APPLICATION PERFORMANCE THROUGH DISABLING OF UNNECESSARY FUNCTIONS

(71) Applicant: Alcatel Lucent, Boulogne-Billancourt (FR)

(72) Inventors: Igor Faynberg, East Brunswick, NJ (US); Hui-Lan Lu, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,645

(22) Filed: Mar. 31, 2020

(65) Prior Publication Data

US 2020/0287873 A1    Sep. 10, 2020

Related U.S. Application Data

(63) Continuation of application No. 14/694,015, filed on Apr. 23, 2015, now Pat. No. 10,645,064.

(51) Int. Cl.
*H04L 29/06* (2006.01)
*G06F 9/455* (2018.01)

(52) U.S. Cl.
CPC ...... *H04L 63/0281* (2013.01); *G06F 9/45558* (2013.01); *H04L 63/30* (2013.01);
(Continued)

(58) Field of Classification Search
CPC ... H04L 63/0281; H04L 63/30; H04L 63/306; H04L 63/164; G06F 9/45558; G06F 2009/45587; G06F 2009/45595
See application file for complete search history.

(56) References Cited

U.S. PATENT DOCUMENTS 5,627,829 A    5/1997 Gleeson et al.
8,250,356 B2   8/2012 Pruss et al.
(Continued)

FOREIGN PATENT DOCUMENTS

CN    102752301    10/2012
CN    103873245    6/2014
(Continued)

OTHER PUBLICATIONS

M. Komu, M. Sethi, R. Mallavarapu, H. Oirola, R. Khan and S. Tarkoma, "Secure Networking for Virtual Machines in the Cloud", 2012 IEEE International Conference on Cluster Computing Workshops, Beijing, 2012, pp. 88-96, doi: 10.1109/ClusterW.2012.29. (Year: 2012).*

(Continued)

*Primary Examiner* — Mahfuzur Rahman
*Assistant Examiner* — Richard W Cruz-Franqui
(74) *Attorney, Agent, or Firm* — Ryan, Mason & Lewis, LLP

(57) ABSTRACT

Improved virtualized application performance is provided through disabling of unnecessary functions, such as unnecessary encryption and decryption operations. An example method performed by a hypervisor includes the steps of obtaining a request from a first virtual machine to perform one or more of encrypting and decrypting of a communication between the first virtual machine and a second virtual machine; determining when the first and second virtual machines execute on a same host as the hypervisor; and in response to the first and second virtual machines executing on the same host: processing the communication without performing the one or more of encrypting and decrypting of the communication, wherein the hypervisor initiates an encryption of further communications between the first virtual machine and the second virtual machine in response (Continued)

to at least one of the first virtual machine and the second virtual machine being moved from the same host.

20 Claims, 7 Drawing Sheets

(52) U.S. Cl.
CPC .. *H04L 63/306* (2013.01); *G06F 2009/45587* (2013.01); *G06F 2009/45595* (2013.01); *H04L 63/164* (2013.01)

(56) References Cited

U.S. PATENT DOCUMENTS

| | | | |
|---|---|---|---|
| 8,977,842 B1 | 3/2015 | McCorkendale et al. | |
| 9,473,472 B1 | 10/2016 | Zhu et al. | |
| 9,780,952 B1 | 10/2017 | Behm et al. | |
| 2004/0105546 A1 | 6/2004 | Chernyak et al. | |
| 2011/0130127 A1 | 6/2011 | Worth et al. | |
| 2011/0299543 A1* | 12/2011 | Diab | G05B 13/02 370/401 |
| 2012/0054741 A1* | 3/2012 | Ali | H04L 9/3234 718/1 |
| 2012/0082249 A1 | 4/2012 | Hsueh et al. | |
| 2012/0250866 A1 | 10/2012 | Matsuo et al. | |
| 2013/0259234 A1 | 10/2013 | Acar et al. | |
| 2014/0019745 A1* | 1/2014 | Dodgson | H04L 63/065 713/150 |
| 2014/0197454 A1 | 7/2014 | Park et al. | |
| 2014/0226820 A1* | 8/2014 | Chopra | H04L 63/0485 380/277 |
| 2014/0379928 A1 | 12/2014 | Song et al. | |
| 2015/0193245 A1 | 7/2015 | Cropper | |
| 2015/0200972 A1* | 7/2015 | Suryavanshi | H04L 63/306 726/1 |
| 2015/0281171 A1* | 10/2015 | Xiao | H04L 61/2532 709/225 |
| 2015/0372984 A1* | 12/2015 | Kacmarcik | H04L 63/0428 726/22 |
| 2016/0021057 A1 | 1/2016 | Frost et al. | |
| 2016/0044030 A1 | 2/2016 | Galwas et al. | |
| 2016/0226834 A1 | 8/2016 | Dawson et al. | |
| 2016/0380938 A1 | 12/2016 | O'Connor et al. | |
| 2017/0063801 A1 | 3/2017 | Faynberg | |
| 2017/0277898 A1 | 9/2017 | Powell | |
| 2017/0339054 A1 | 11/2017 | Yadav et al. | |
| 2018/0189677 A1 | 7/2018 | Anderson et al. | |
| 2019/0073475 A1 | 3/2019 | Gupta et al. | |

FOREIGN PATENT DOCUMENTS

| | | |
|---|---|---|
| JP | 2013507044 A | 2/2013 |
| JP | 2013535711 A | 9/2013 |
| JP | 2014049944 A | 3/2014 |

OTHER PUBLICATIONS

NPL Search (Google Scholar) (Year: 2020).*
NPL Search (Google Patent) (Year: 2021).*
Fernandes Diogo et al., "Security Issues in Cloud Environments: A Survey", International Journal of Information Security (IJIS), Springer, Heidelberg, DE, vol. 13, No. 2, Sep. 28, 2013.
CN Office Action from related Application No. CN 201680022693, dated Aug. 4, 2020.
Zhongliang Niu, et al., "Discussion on the Flattening of Data Center Network", Grass-roots Practice, 2013.

* cited by examiner

FIG. 2

```
struct Context
{
    *IPsec_Context C; /*pointer to the corresponding IKE context, which is also a key to the
Context entry */
    IPaddress IP1;
    IPaddress IP2; /* this and the previous entry form a key to the Context entry */
    *array Message_buffer_1; /*for VM 1*/
    *array Message_buffer_2; /*for VM 2*/
    /* administration entries */
    iInt creation_time;
    ...
    /* LI only */
    Boolean Intecept;
    Tap Intercept_addr;
}                                                                        } 220

_IKE invocation entry:
    If (destination_address belongs to a local VM)
        Create_context (IKE_context))                                    } 210
```

```
_encrypt:
    If there exists context (IKE_context)
        /* do nothing */
    else
        Continue with the IPsec encryption
```

```
_decrypt:
    If there exists context (IKE_context)
        /* do nothing */
    else
        Continue with the IPsec decryption;
```

```
_encrypt:
   If there exists context (IKE_context)
   {
      Place the unencrypted message in the queue within the buffer 530 or the destination VM;
      Return an all-0 (or random) entry; /* not much can be learned from intercepting this . . . */
   }
   else
      Continue with the IPsec encryption;
```

FIG. 7

```
700 ~
_decrypt:
    If there exists context (IKE_context)
    ~
        Locate the original (unencrypted) message in the appropriate queue within the message buffer;
        Return the original message (and discard the contents of the input);
    ~
    else
        Continue with the IPsec decryption;
```

VIRTUALIZED APPLICATION PERFORMANCE THROUGH DISABLING OF UNNECESSARY FUNCTIONS

CROSS-REFERENCE TO RELATED APPLICATIONS

This application is a continuation of U.S. patent application Ser. No. 14/694,015, filed Apr. 23, 2015, the disclosure of which is hereby incorporated by reference in its entirety.

FIELD

The application relates generally to secure data communications, and more particularly to techniques for improving the performance of such secure data communications.

BACKGROUND

Network Function Virtualization (NFV) uses Information Technology (IT) virtualization-related technologies to virtualize classes of network node functions into building blocks that may be connected to create communication services. A service provider that implements an NFV design will implement one or more Virtualized Network Functions (VNFs) (i.e., software implementations of network functions). Multiple VNFs are typically employed in a sequence to deliver a given service.

Lawful Interception (LI) is the task of lawfully obtaining communications data, such as network management information or communication content, for the purpose of analysis or evidence. Lawful Interception may comprise intercepting telecommunications on behalf of law enforcement agencies (LEAs), administrative agencies, intelligence services or other authorized agencies.

The virtualization of network functions deployed on general purpose standardized hardware is expected to significantly reduce the costs of deployment and maintenance, and to also reduce product development times. Nonetheless, a need remains for NFV environments that achieve improved performance by disabling unnecessary functions, such as encryption. In addition, a need exists for improved techniques for performing Lawful Interception (LI) in a virtualized environment.

SUMMARY

In an example of an embodiment, a method is disclosed that includes obtaining, by a hypervisor, a request from a first virtual machine to perform one or more of encrypting and decrypting of a communication between the first virtual machine and a second virtual machine; determining, by the hypervisor, when said first and second virtual machines execute on a same host as the hypervisor; and in response to said first and second virtual machines executing on said same host: processing, by the hypervisor, said communication without performing said one or more of encrypting and decrypting of said communication, wherein the hypervisor initiates an encryption of further communications between said first virtual machine and said second virtual machine in response to at least one of said first virtual machine and said second virtual machine being moved from said same host.

In another example of an embodiment, an article of manufacture is provided which comprises a tangible processor-readable storage medium having encoded therein executable code of one or more software programs. The one or more software programs when executed by at least one processing device implement steps of the above-described method.

In yet another embodiment, an apparatus comprises a memory and at least one hardware device configured to perform steps of the above-described method.

BRIEF DESCRIPTION OF THE DRAWINGS

FIG. 2 illustrates exemplary pseudo code related to the context of a given encrypted pipe of FIG. 1;

FIGS. 3 and 4 illustrate exemplary pseudo code for an encrypt system call and a decrypt system call, respectively, in accordance with illustrative embodiments;

FIGS. 6 and 7 illustrate exemplary pseudo code for an encrypt system call and a decrypt system call, respectively, for use in the exemplary virtualized environment of FIG. 5.

DETAILED DESCRIPTION

Illustrative embodiments of the invention provide techniques and apparatuses for improved virtualized application performance through disabling of unnecessary functions, such as unnecessary encryption and decryption operations. For example, in one embodiment, a method performed by a hypervisor includes the steps of obtaining a request to one or more of encrypt and decrypt a communication between a first virtual machine and a second virtual machine; determining if the first and second virtual machines execute on a same host as the hypervisor (e.g., by evaluating a context of the communication); and processing the communication without encrypting or decrypting the communication if the first and second virtual machines execute on the same host. Lawful Interception can be performed by forwarding an unencrypted version of the communication to an authorized agency.

In one example embodiment, when the communication traverses a switch and/or a router between the first virtual machine and the second virtual machine, an unencrypted version of the communication is placed in a queue within a buffer of one or more of the hypervisor and a destination virtual machine and one or more of a random value and an all-zero value are returned to a caller. The unencrypted version of the communication is then located in the queue and returned to the destination virtual machine.

Illustrative embodiments of the present disclosure will be described herein with reference to exemplary virtualized environment, computing systems, communication systems, processing platforms, networks, network nodes, network elements, and associated communication protocols. However, it should be understood that embodiments of the present disclosure are not limited to use with the particular arrangements described, but are instead more generally applicable to any virtualized environment in which it is desirable to provide improved performance by disabling unnecessary functions, such as unnecessary encryption and decryption functions.

Aspects of the present disclosure recognize that in a virtualized environment there are often redundant encryption and decryption operations performed for the traffic between two virtual machines that share a common host and thus are under the control of the same hypervisor. According to one embodiment of the disclosure, redundant encryption and decryption operations are disabled for the traffic between two virtual machines that share a common host. For example, in one exemplary embodiment, the hypervisor employs introspection techniques to examine the context of a communication at nm-time in order to determine whether encryption and/or decryption operations are needed for a given communication.

Figure 1:
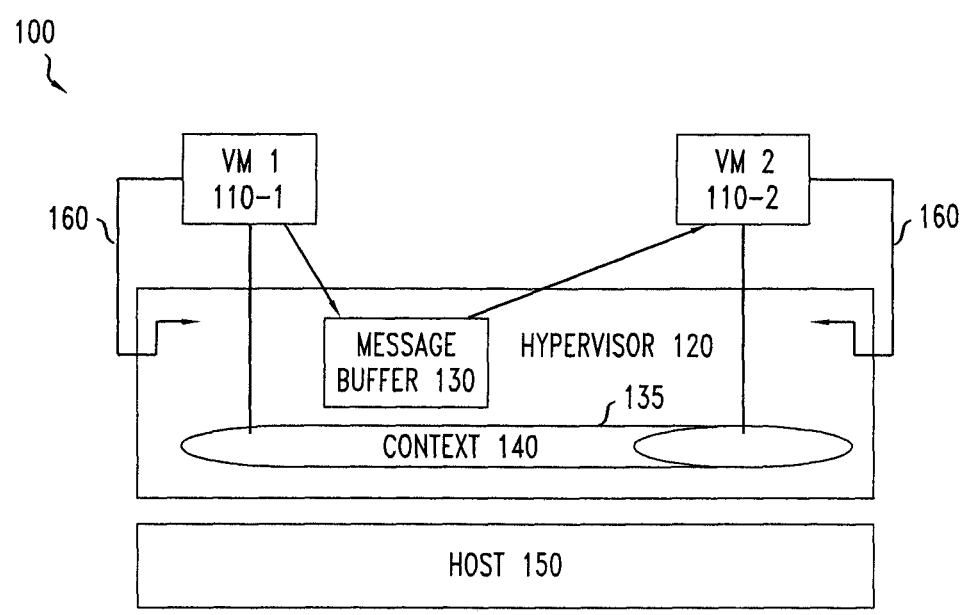
FIG. 1 illustrates an exemplary virtualized environment in which one or more embodiments of the present disclosure are implemented.

FIG. 1 illustrates an exemplary virtualized environment 100 in which one or more embodiments of the present disclosure may be implemented. As shown in FIG. 1, at least two exemplary virtual machines 110-1 and 110-2 are located on a same host 150. The two exemplary virtual machines 110-1 and 110-2 are implemented using a hypervisor 120 and communicate over an encrypted pipe 135. The hypervisor 120 runs on a physical infrastructure of the host 150. The parameters of the encrypted pipe 135 comprise a context 140. The encrypted pipe 135 may employ, for example, Internet Protocol Security (IPsec) to secure Internet Protocol (IP) communications over the encrypted pipe 135 by authenticating and encrypting each IP packet of a communication session. In a further variation, the encrypted pipe 135 may employ, for example, Transport Layer Security (TLS) to secure the encrypted pipe 135. It is noted, however, that the embodiments of the present disclosure may be applied to all possible tunneling protocols between the endpoints, as would be apparent to a person of ordinary skill in the art.

Example of a commercially available hypervisor platform that may be used to implement hypervisor 120 and possibly other portions of the system in one or more embodiments of the present disclosure is a KVM (Kernel-based Virtual Machine) hypervisor or a XEN hypervisor. In addition, as discussed further below in conjunction with FIG. 5, the exemplary hypervisor 120 may optionally have an associated virtual infrastructure management system, such as a Cloud Orchestration and Management System (e.g., the CloudBand™ NFV platform from Alcatel-Lucent of Boulogne-Billancourt, France) or an Operations Support System (such as the Service Aware Manager™ (SAM) from Alcatel-Lucent of Boulogne-Billancourt, France). The underlying physical machines (e.g., hosts 150) may comprise one or more distributed processing platforms that include storage products.

The exemplary virtualized environment 100 further comprises one or more applications (not shown) running on the virtual machines 110-1, 110-2 under the control of the hypervisor 120.

As discussed further below in conjunction with FIG. 2, the exemplary context 140 of the encrypted pipe 135 comprises IP addresses of the two exemplary virtual machines 110-1 and 110-2, encryption keying material needed for the encrypted pipe 135, port numbers (e.g., in the case of TLS), and other tunnel parameters.

In the embodiment of FIG. 1, however, where the two virtual machines 110-1 and 110-2 share a common host 150, no actual networking is involved on the encrypted pipe 135, as the "messages" are segments of the memory of the hypervisor 120. In one exemplary implementation, communications between the two exemplary virtual machines 110-1 and 110-2 are temporarily stored in a message buffer 130 for transfer. With conventional techniques, each protocol data unit (i.e., each message) received from a source virtual machine, such as virtual machine 110-1, is passed to the hypervisor 120, which encrypts the received message and stores the encrypted message in the message buffer 130. The hypervisor 120 then copies the contents of the message buffer 130 and decrypts the encrypted message for delivery to the destination virtual machine, such as virtual machine 110-2.

As noted above, aspects of the present disclosure reduce one or more redundant encryption and decryption operations by disabling a given encryption operation and associated decryption operation for the traffic on the encrypted pipe 135 between the two virtual machines 110-1 and 110-2 having a common host. In one exemplary embodiment, the hypervisor employs introspection techniques to examine the context 140 of a communication at run-time in order to determine whether encryption and/or decryption operations are needed for a given communication.

In one exemplary implementation, the hypervisor 120 detects that one virtual machine, such as virtual machine 110-1, is trying to establish a cryptographically protected tunnel with another virtual machine, such as virtual machine 110-2, on the same host 150 by means of breakpointing the invocations of a cryptographic tunneling protocol, such as TLS or IPsec, to establish the encrypted pipe 135 (e.g., a tunnel). Once an encrypted pipe 135 is established, the hypervisor 120 learns the context 140 and stores the context 140 in a data structure, discussed further below in conjunction with FIG. 2, which associates both virtual machines 110.

As discussed further below in conjunction with FIGS. 3 and 4, the hypervisor 120 evaluates the context 140 on each subsequent system call (from either virtual machine 110-1 or 110-2) that involves the encryption invocation. The hypervisor 120, however, does not perform the encryption/decryption operation(s) when the virtual machines 110 are on the same host 120. Rather, on an encrypt call, the exemplary hypervisor 120 returns system calls (e.g., an acknowledgement) as though the encryption took place and passes the message buffer 130 unencrypted to the destination virtual machine. Similarly, the hypervisor 120 ignores a later call to decrypt the contents of the message buffer 130.

In addition, as shown in FIG. 1, the exemplary hypervisor 120 employs one or more system call traps 160 to virtualize the execution of certain instructions. In this manner, instructions are discovered and replaced with traps 160 into the virtual machine environment to be emulated in software, in a known manner.

FIGS. 2-4 illustrate exemplary pseudo code for an exemplary IPsec implementation of the present disclosure. The appropriate pseudo code for alternate implementations, such as a TLS implementation, would be apparent to a person of ordinary skill in the art, based on the present disclosure. For example, for a TLS implementation, the context 140 comprises source-destination ports, as would be apparent to a person of ordinary skill in the art.

FIG. 2 illustrates exemplary pseudo code 200 related to the context 140 of a given encrypted pipe 135. As shown in FIG. 2, the exemplary pseudo code 200 comprises code 210 for creating a data structure that stores the context 140. The exemplary context 140 comprises a pointer to the Internet Key Exchange (IKE) context of the exemplary IPsec protocol suite where the encryption keying material needed for the encrypted pipe 135 is stored. In addition, the exemplary data structure for the context 140 comprises the IP addresses of the two exemplary virtual machines 110-1 and 110-2 associated with the encrypted pipe 135.

In addition, the exemplary code 210 that creates the context data structure includes a portion for enabling Lawful Interception (LI) in the virtualized environment 100.

The exemplary pseudo code 200 further includes a handler routine 220 for handling an IPsec Key Exchange system call invocation. As shown in FIG. 2 on an IPsec Key Exchange system call, the IKE context is established if the destination address belongs to a local virtual machine 100.

FIG. 3 illustrates exemplary pseudo code for an encrypt system call 300 according to one embodiment of the present disclosure. As shown in FIG. 3, on an encrypt system call 300, the handler deals with an incoming message by initially determining if there is context (IKE_context, created by the pseudo code 200 of FIG. 2) for the communication on the current host 150. If there is context (i.e., the two virtual machines involved in the communication are on the same host), then the exemplary encrypt system call 300 does not encrypt the communication. If there is not context (i.e., the two virtual machines involved in the communication are not on the same host), then the exemplary encrypt system call 300 continues with the IPsec encryption in a conventional manner.

FIG. 4 illustrates exemplary pseudo code for a decrypt system call 400 according to one embodiment of the present disclosure. As shown in FIG. 4, on a decrypt system call 400, the handler deals with an incoming message by initially determining if there is context (IKE_context, created by the pseudo code 200 of FIG. 2) for the communication on the current host 150. If there is context (i.e., the two virtual machines involved in the communication are on the same host), then the exemplary decrypt system call 400 does not decrypt the communication. If there is not context (i.e., the two virtual machines involved in the communication are not on the same host), then the exemplary decrypt system call 400 continues with the IPsec decryption in a conventional manner.

Figure 5:
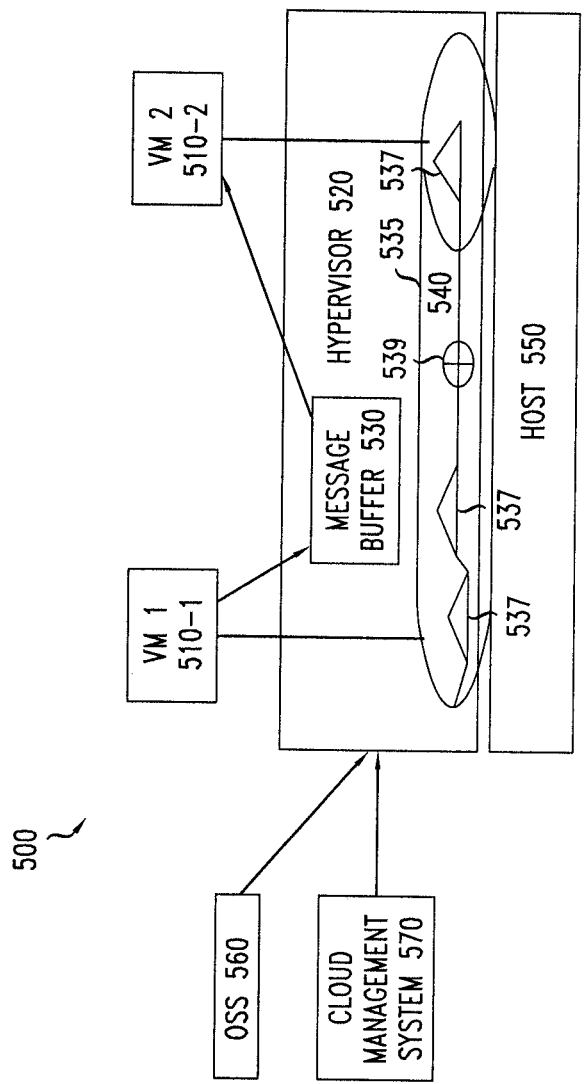
FIG. 5 illustrates an alternate exemplary virtualized environment having one or more virtual switches and/or routers in which one or more embodiments of the present disclosure may be implemented.

FIG. 5 illustrates an alternate exemplary virtualized environment 500 having one or more virtual switches and routers in which one or more embodiments of the present disclosure may be implemented. As shown in FIG. 5, at least two exemplary virtual machines 510-1 and 510-2 are located on a same host 550. The two exemplary virtual machines 510-1 and 510-2 are implemented using a hypervisor 520 and communicate over an encrypted pipe 535. The hypervisor 520 runs on a physical infrastructure of the host 550, in a similar manner as the embodiment of FIG. 1. The encrypted pipe 535 and related context 540 can be implemented in a similar manner as the embodiment of FIG. 1. The exemplary virtualized environment 500 further comprises one or more applications (not shown) running on the virtual machines 510-1, 510-2 under the control of the hypervisor 520.

As shown in FIG. 5, the exemplary virtualized environment 500 comprises one or more virtual switches 537 and/or one or more routers 539. In the presence of virtual switches 537 and/or routers 539, care must be taken that the messages may not be intercepted by other virtual machines. In the case of Lawful Interception, these mechanisms will aid interception.

In the embodiment of FIG. 5, the two virtual machines 510-1 and 510-2 share a common host 550, in a similar manner as the embodiment of FIG. 1. In one exemplary implementation, communications between the two exemplary virtual machines 510-1 and 510-2 are temporarily stored in a message buffer 530 for transfer. As noted above, aspects of the present disclosure reduce one or more redundant encryption and decryption operations by disabling a given encryption operation and associated decryption operation for the traffic on the encrypted pipe 535 between the two virtual machines 510-1 and 510-2 having a common host. In one exemplary embodiment, the hypervisor 520 employs introspection techniques to examine the context 540 of a communication at run-time in order to determine whether encryption and/or decryption operations are needed for a given communication.

In one exemplary implementation, the hypervisor 520 detects that one virtual machine, such as virtual machine 510-1, is trying to establish a cryptographically protected tunnel with another virtual machine, such as virtual machine 510-2, on the same host 550 and becomes aware of the context 540. Thereafter, the hypervisor 520 carries the actual messages directly between virtual machine 510-1 and virtual machine 510-2 by means of copying the message buffer 530. The switches 537 and routers 539 are fed dummy messages (e.g., with a random or all-zero payload), that are ignored upon receipt.

An operations support system (OSS) 560 enables end-to-end network and service management across all domains of the converged IP network. The exemplary operations support system 560 delivers unified operations, whether network services are running in a virtualized environment or on specialized hardware platforms. The exemplary operations support system 560 may be embodied, for example, using the Service Aware Manager (SAM) of Alcatel-Lucent.

A cloud management system 570 optionally orchestrates, automates, and improves virtual network functions across a distributed network and data centers of a service provider. The cloud management system 570 may be embodied, for example, using the CloudBand Management System of Alcatel-Lucent. Generally, the cloud management system 570 optionally aggregates distributed cloud nodes and provides a view of the entire NFV infrastructure as a single, carrier-grade pool.

The exemplary operations support system 560 and/or the exemplary cloud management system 570 can issue direct instructions for creation and/or deletion of a given context.

FIG. 6 illustrates exemplary pseudo code for an encrypt system call 600 for use in the exemplary virtualized environment 500 of FIG. 5. As shown in FIG. 6, on an encrypt system call 600, the handler deals with an incoming message by initially determining if there is context (IKE_context, created by the pseudo code 200 of FIG. 2) for the communication on the current host 550. If there is context (i.e., the two virtual machines involved in the communication are on the same host), then the exemplary encrypt system call 600 places the unencrypted message in a queue within the buffer 530 or the destination virtual machine 510 and returns an all-zero (or random) entry to the caller. If there is not context (i.e., the two virtual machines involved in the communication are not on the same host), then the exemplary encrypt system call 600 continues with the IPsec encryption in a conventional manner.

FIG. 7 illustrates exemplary pseudo code for a decrypt system call 700 for use in the exemplary virtualized environment 500 of FIG. 5. As shown in FIG. 7, on a decrypt system call 700, the handler deals with an incoming message by initially determining if there is context (IKE_context, created by the pseudo code 200 of FIG. 2) for the communication on the current host 550. If there is context (i.e., the two virtual machines involved in the communication are on the same host), then the exemplary decrypt system call 700 locates the original (unencrypted) message in the appropriate queue within the message buffer 530 and returns the original message (and discards the contents of the input). If there is not context (i.e., the two virtual machines involved in the communication are not on the same host), then the exemplary decrypt system call 700 continues with the IPsec decryption in a conventional manner.

In the event that one of the virtual machines 110, 510 described herein is moved to another host 150, 550, it is important to revert to the encryption of communications between the two virtual machines that are no longer on the same host. In this case, the hypervisor 120, 520 that disabled the encryption will restore the encryption upon detecting that a virtual machine has moved. This detection can be triggered by the change in the context 140, 540 signaled by several means (e.g., the termination of a virtual machine, such as virtual machine 510-2, or an action from the operations support system 560 or the cloud orchestration management system 570).

In the case of Lawful Interception, with the above mechanism, the communication stream in question can be forwarded unencrypted for the interception. The granularity in the communication stream selection can optionally be narrowed to a specific (IP address, Port) pair. This arrangement will work independent of the need for performance optimization. In this manner, intercepted communications data can be provided to an authorized agency.

Figure 8:
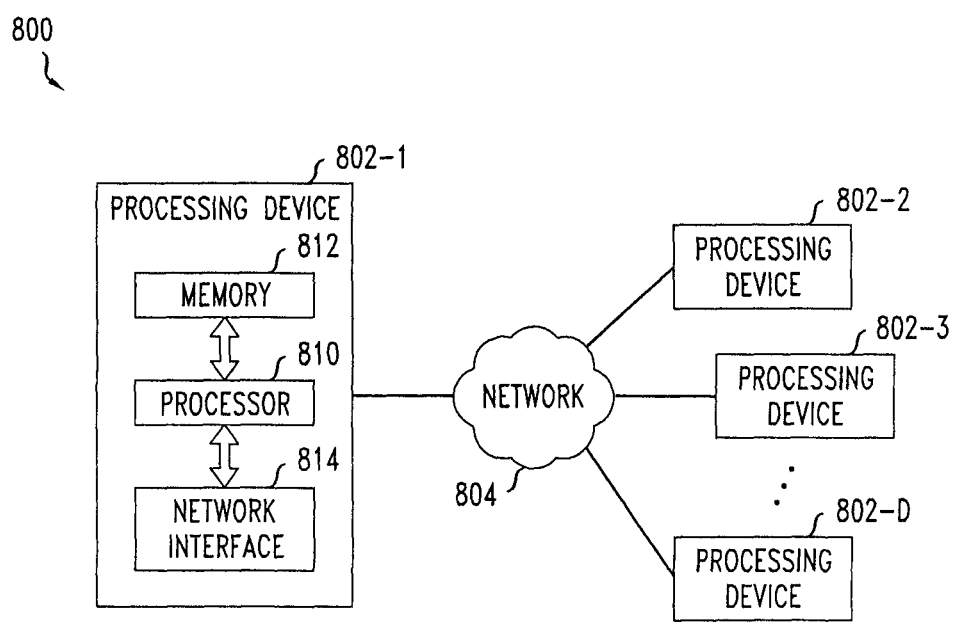
FIG. 8 shows a processing platform on which one or more embodiments of the present disclosure are implemented.

FIG. 8 shows a processing platform 800 on which one or more embodiments of the present disclosure are implemented. The processing platform 800 in this embodiment comprises at least a portion of the given system and includes a plurality of processing devices, denoted 802-1, 802-2, 802-3, ... 802-D, which communicate with one another over a network 804. The network 804 may comprise any type of a network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read only memory (ROM) or other types of memory, in any combination.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 1, 5 or 8, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Although certain illustrative embodiments are described herein in the context of communication networks and systems utilizing particular communication protocols, other types of networks and systems can be used in other embodiments. As noted above, the term "network" or "system" as used herein is therefore intended to be broadly construed. Further, it should be emphasized that the embodiments described above are for purposes of illustration only, and should not be interpreted as limiting in any way. Other embodiments may use different types of network, system, device and module configurations, and alternative communication protocols, process steps and operations for implementing security functionality. The particular manner in which the user devices and network nodes communicate can be varied in other embodiments. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method, comprising:
    obtaining, by a hypervisor, a request from a first virtual machine to perform one or more of encrypting and decrypting of a communication between the first virtual machine and a second virtual machine;
    determining, by the hypervisor, when said first and second virtual machines execute on a same host as the hypervisor at least in part by evaluating a context of said communication;
    in response to said first and second virtual machines executing on said same host:
    processing, by the hypervisor, said communication without performing said one or more of encrypting and decrypting of said communication; and
    initiating, by the hypervisor, an encryption of further communications between said first virtual machine and said second virtual machine in response to detecting that at least one of said first virtual machine and said second virtual machine is moved to another host.

2. The method of claim 1, wherein said context is one or more of created, adjusted and deleted based on an instruction from one or more of an operations support system and a cloud orchestration management system.

3. The method of claim 1, wherein said processing comprises:

storing said communication in a buffer of said hypervisor; and transferring said communication between said first virtual machine and said second virtual machine directly from said buffer without performing said one or more of encrypting and decrypting.

4. The method of claim 1, further comprising the step of performing one or more of said encryption and said decryption of said communication when said first and second virtual machines do not both execute on said same host.

5. The method of claim 1, wherein said communication traverses one or more of at least one switch and at least one router between said first virtual machine and said second virtual machine and wherein said method further comprises the steps of placing an unencrypted version of said communication in a queue within a buffer of one or more of said hypervisor and a destination virtual machine and returning one or more of a random value and an all-zero value to a caller.

6. The method of claim 5, wherein said method further comprises the steps of locating said unencrypted version of said communication in said queue and returning said unencrypted version of said communication to said destination virtual machine.

7. The method of claim 1, further comprising the step of forwarding an unencrypted version of said communication for Lawful Interception.

8. An article of manufacture comprising a non-transitory processor-readable storage medium having embodied therein executable program code that when executed by the processing device causes the processing device to perform the following steps:

obtaining, by a hypervisor, a request from a first virtual machine to perform one or more of encrypting and decrypting of a communication between the first virtual machine and a second virtual machine;

determining, by the hypervisor, when said first and second virtual machines execute on a same host as the hypervisor at least in part by evaluating a context of said communication;

in response to said first and second virtual machines executing on said same host:

processing, by the hypervisor, said communication without performing said one or more of encrypting and decrypting of said communication; and initiating, by the hypervisor, an encryption of further communications between said first virtual machine and said second virtual machine in response to detecting that at least one of said first virtual machine and said second virtual machine is moved to another host.

9. The article of manufacture of claim 8, wherein said context is one or more of created, adjusted and deleted based on an instruction from one or more of an operations support system and a cloud orchestration management system.

10. The article of manufacture of claim 8, wherein said processing comprises:

storing said communication in a buffer of said hypervisor; and transferring said communication between said first virtual machine and said second virtual machine directly from said buffer without performing said one or more of encrypting and decrypting.

11. The article of manufacture of claim 8, further comprising the step of performing one or more of said encryption and said decryption of said communication when said first and second virtual machines do not both execute on said same host.

12. The article of manufacture of claim 8, wherein said communication traverses one or more of at least one switch and at least one router between said first virtual machine and said second virtual machine and wherein the steps further comprise:

placing an unencrypted version of said communication in a queue within a buffer of one or more of said hypervisor and a destination virtual machine and returning one or more of a random value and an all-zero value to a caller.

13. The article of manufacture of claim 12, wherein the steps further comprise:

locating said unencrypted version of said communication in said queue and returning said unencrypted version of said communication to said destination virtual machine.

14. An apparatus, comprising:

a memory; and at least one hardware device operatively coupled to the memory and configured to perform the following steps:

obtain, by a hypervisor, a request from a first virtual machine to perform one or more of encrypting and decrypting of a communication between the first virtual machine and a second virtual machine;

determine, by the hypervisor, when said first and second virtual machines execute on a same host as the hypervisor at least in part by evaluating a context of said communication;

in response to said first and second virtual machines executing on said same host:

process, by the hypervisor, said communication without performing said one or more of encrypting and decrypting of said communication; and initiate, by the hypervisor, an encryption of further communications between said first virtual machine and said second virtual machine in response to detecting that at least one of said first virtual machine and said second virtual machine is moved to another host.

15. The apparatus of claim 14, wherein said context is one or more of created, adjusted and deleted based on an instruction from one or more of an operations support system and a cloud orchestration management system.

16. The apparatus of claim 14, wherein said processing comprises:

storing said communication in a buffer of said hypervisor; and transferring said communication between said first virtual machine and said second virtual machine directly from said buffer without performing said one or more of encrypting and decrypting.

17. The apparatus of claim 14, wherein said at least one hardware device is further configured to perform one or more of said encryption and said decryption of said communication when said first and second virtual machines do not both execute on said same host.

18. The apparatus of claim 14, wherein said communication traverses one or more of at least one switch and at least one router between said first virtual machine and said second virtual machine and wherein said at least one hardware device is further configured to:

place an unencrypted version of said communication in a queue within a buffer of one or more of said hypervisor and a destination virtual machine and return one or more of a random value and an all-zero value to a caller.

19. The apparatus of claim 18, wherein said at least one hardware device is further configured to locate said unencrypted version of said communication in said queue and return said unencrypted version of said communication to said destination virtual machine.

20. The apparatus of claim 14, wherein said at least one hardware device is further configured to forward an unencrypted version of said communication for Lawful Interception.

\* \* \* \* \*